US011197319B1

(12) United States Patent
Haider et al.

(10) Patent No.: US 11,197,319 B1
(45) Date of Patent: Dec. 7, 2021

(54) ENHANCED SPATIAL REUSE OF RADIO SPECTRUM IN WLAN OPERATION

(71) Applicant: Hewlett Packard Enterprise Development LP, Houston, TX (US)

(72) Inventors: Muhammad Kumail Haider, Palo Alto, CA (US); Kyu-Han Kim, Palo Alto, CA (US)

(73) Assignee: Hewlett Packard Enterprise Development LP, Houston, TX (US)

(*) Notice: Subject to any disclaimer, the term of this patent is extended or adjusted under 35 U.S.C. 154(b) by 26 days.

(21) Appl. No.: 16/876,832

(22) Filed: May 18, 2020

(51) Int. Cl.
*H04W 74/08* (2009.01)
*H04B 17/336* (2015.01)
*H04W 76/11* (2018.01)
*H04W 84/12* (2009.01)

(52) U.S. Cl.
CPC ...... *H04W 74/0808* (2013.01); *H04B 17/336* (2015.01); *H04W 76/11* (2018.02); *H04W 84/12* (2013.01)

(58) Field of Classification Search
CPC . H04W 74/0808; H04W 76/11; H04W 84/12; H04B 17/336
USPC ............... 370/329, 310.2; 455/418, 422.1
See application file for complete search history.

(56) References Cited

U.S. PATENT DOCUMENTS

| | | | | |
|---|---|---|---|---|
| 2014/0328270 | A1* | 11/2014 | Zhu | H04W 74/002 370/329 |
| 2015/0358904 | A1* | 12/2015 | Kwon | H04W 24/08 370/252 |
| 2016/0219461 | A1* | 7/2016 | Huang | H04W 74/0808 |
| 2016/0309357 | A1* | 10/2016 | Wong | H04L 1/0009 |
| 2017/0164406 | A1* | 6/2017 | Son | H04W 72/082 |
| 2017/0311352 | A1* | 10/2017 | Lv | H04W 74/0816 |
| 2018/0249501 | A1* | 8/2018 | Ko | H04W 74/0808 |
| 2018/0317233 | A1* | 11/2018 | Tsodik | H04W 76/10 |
| 2019/0230533 | A1* | 7/2019 | Huang | H04W 16/10 |
| 2019/0230703 | A1* | 7/2019 | Lv | H04B 17/318 |

(Continued)

OTHER PUBLICATIONS

Afaqui et al., "IEEE 802.11ax: Challenges and requirements for future high efficiency Wi-Fi", IEEE Wireless Communications, Dec. 2016, pp. 1-9.

(Continued)

*Primary Examiner* — Danh C Le
(74) *Attorney, Agent, or Firm* — Jaffery Watson Mendonsa & Hamilton

(57) ABSTRACT

Enhanced spatial reuse of radio spectrum in WLAN operation is described. An example of a storage medium includes instructions for connecting with multiple client devices at an access point in a basic service set (BSS) for transmission over a channel in a network environment; estimating a communication quality value for each of the client devices based at least in part on received signal strength values at the access point and at the client device; prioritizing spatial reuse operation based on the estimated communication quality values for the client devices; establishing a clear channel assessment (CCA) threshold for a spatial reuse operation in a transmission to a first client device, the first client device being selected based on an estimated communication quality value; and dynamically adjusting the CCA threshold based at least in part on success or failure of data transmission between the access point and the first client device.

20 Claims, 8 Drawing Sheets

(56) References Cited

U.S. PATENT DOCUMENTS

2021/0029716 A1* 1/2021 Tsodik .............. H04W 74/0808
2021/0235491 A1* 7/2021 Iyer ...................... H04W 72/14

OTHER PUBLICATIONS

Boris Bellalta, "IEEE 802.11ax: High-Efficiency WLANs", IEEE Wireless Communications Magazine, Jul. 28, 2015, pp. 1-16.
Chuck Lukaszewski, "IEEE 802.11-15/1082r0: Analysis of BSS and ESS Structure During Concurrent SR Transmissions", Aruba Networks, Sep. 13, 2015, pp. 1-32.
Lukaszewski et al., "Cost/Benefit Analysis of SR Techniques", IEEE 802.11-15/1083r1, Sep. 13, 2015, pp. 1-39.
Lukaszewski et al., "Spatial Reuse Measurements", IEEE 802.11-15/1039r0, Aug. 7, 2015, pp. 1-25.
Qu, et al., "Survey and Performance Evaluation of the Upcoming Next Generation WLANs Standard-IEEE 802.11 ax", Mobile Networks and Applications, May 15, 2019, pp. 1461-1474.

\* cited by examiner

ENHANCED SPATIAL REUSE OF RADIO SPECTRUM IN WLAN OPERATION

BACKGROUND

As wireless devices continue to increase in number, the operation of client devices and access points in wireless local access networks (WLAN) are often in close proximity with other WLANs. The close physical distances can result in signal interference and collisions on common radio channels. This condition is conventionally addressed by measuring the signal energy and backing off from transmission if the signal energy is above a certain threshold, such as the clear channel assessment (CCA) threshold −82 dBm for Wi-Fi operations.

Spatial reuse (SR) in Wi-Fi 6 for AP deployments can assist in improving operations in the same Wi-Fi bands by multiple units. In this regard, IEEE 802.11ax allows for modification of the CCA threshold between −82 dBm and −62 dBm, thus potentially allowing for increased usage in a certain physical area.

However, effective implementation of spatial reuse is left to the individual implementations. Legacy Wi-Fi is based on CSMA/CA (Carrier Sense Multiple Access/Collision Avoidance), and generally applies the conservative CCA threshold, which wastes potential spectrum capacity. While using the default CCA may underutilize the radio spectrum, moving to a CCA threshold that is too high creates the risk of greater packet collisions and lower throughput for the network as a whole.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Figure 1:
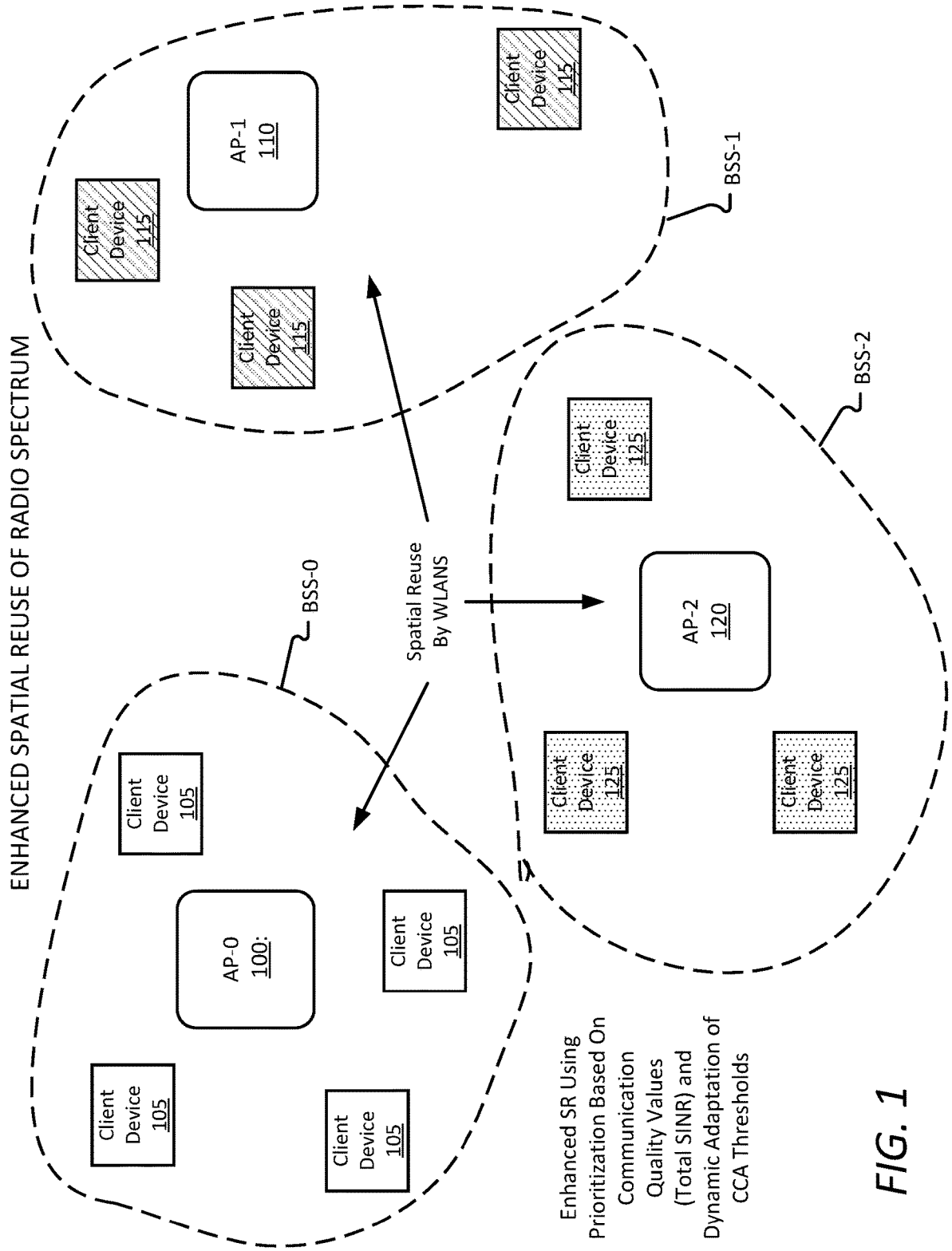
FIG. 1 is an illustration of enhanced spatial reuse of radio spectrum, according to some embodiments.

Embodiments described herein are directed to enhanced spatial reuse of radio spectrum in WLAN operation.

Enterprise Wi-Fi is facing a network densification challenge both in terms of number of mobile devices and AP deployments, resulting in same channel operation by access points APs in close proximity to each other (typically 20-40 meters apart). Crowded public places such as airports, shopping malls, and stadiums with multiple vendor deployments may further aggravate this issue.

Legacy Wi-Fi is based on CSMA/CA (Carrier Sense Multiple Access/Collision Avoidance), where communicating devices defer to transmissions with received signal strength (RSS) that is higher than the CCA (Clear Channel Assessment) threshold. Because legacy Wi-Fi uses conservative CCA thresholds (typically −82 dBm (decibel-milliwatts)), this results in inefficient utilization of the wireless medium. Neighboring client devices and APs may be deferring to transmissions in scenarios where concurrent transmissions could be successfully achieved, thus degrading network throughput.

To mitigate this issue, Wi-Fi 6 (IEEE (Institute of Electrical and Electronics Engineers) 802.11ax) is introducing certain key spatial reuse (SR) features to enable simultaneous transmissions in neighboring BSSs (Basic Service Sets) on the same channels. In particular, Wi-Fi 6 introduces BSS color (referring to an identifier code within the preamble of an 802.11ax PHY header) to identify received packets as belonging to either the same BSS or an overlapping BSS (OBSS). In addition an OBSS-PD (OBSS Preamble Detection) mechanism may use a higher CCA threshold for OBSS packets to promote SR, with an SRP (Spatial Reuse Protocol) mechanism to enable an access point to allow spatial reuse in OBSSs depending on its transmit power and CCA threshold.

The Wi-Fi 6 technology provides the ability to modify the CCA threshold level to control SR transmissions. More specifically, the IEEE 802.11ax standard allows the CCA threshold to be altered between −82 dBm to −62 dBm, and recommends trading off transmit power when increasing the CCA threshold to protect devices at cell edge and to reduce collisions. However, the Wi-Fi 6 standard does not specify a protocol for how to best adjust the CCA threshold to optimize network throughput performance for commodity Wi-Fi 6 devices in enterprise networks.

In some embodiments, an apparatus, system, or process is to provide operations for enhanced spatial reuse performance in APs under Wi-Fi 6 (and future standards), while operating within the protocol requirements and without requiring modification of client devices. In some embodiments, the operations include identifying and prioritizing client devices having a high communication quality value, such as a high SINR (Signal to Interference plus Noise Ratio) value, based on an estimation process; and dynamically adjusting the CCA threshold for spatial reuse transmission to adapt to changing network topologies and mobile devices within the network.

In some embodiments, the apparatus, system, or process is more specifically to provide for determining a total SINR (i.e., SINR for both uplink and downlink) for SR transmission to each of a plurality of client devices based on RSS measurements to neighboring APs and between APs on a same channel. In such operation a client device having the highest total SINR value of the devices within a BSS then is selected, and, when packets from OBSSs are detected, a CCA threshold value for the OBSS is applied, and is dynamically adapted based on the current conditions. Further, spatial reuse is turned off for other client devices having a lower total SINR to ensure the communication medium is shared between APs, to ensure that SR doesn't generate unnecessary signal collisions, and to increase likelihood of successful SR transmission. In this manner, a process allows for optimizing the spatial reuse of devices that are most capable of taking advantage of spatial reuse, and avoiding spatial reuse for other devices. In some embodiments, an apparatus, system, or process is expanded to provide a different CCA threshold for each of multiple overlapping BSSs (as determined by, for example, the BSS color data or other data identifying the BSS (referred to herein as a BSS identification (ID)) in each broadcast packet) in order to tune the network performance on the basis of the actual activity and signal strength of OBSS interference.

In some embodiments, an apparatus, system or process further includes an AP coordination mechanism to share throughput statistics data between APs (either directly or via a central controller) to ensure that the SR operation utilizing dynamic adaptation of CCA thresholds is providing a positive effect on overall spectrum usage across multiple access points and BSSs in the network, and to disable the dynamic adaptation of CCA thresholds if a negative effect is determined.

As used herein, access point (AP) (also referred to as a wireless access point (WAP)) refers to a networking hardware device that allows wireless devices to connect to a network, including connection to the Internet or an intranet. The AP may connect to a router (via a wired network) as a standalone device, or may be an integral component of the router itself. An AP includes communication using any IEEE 802.11 Wi-Fi standards, including more specifically communication using IEEE 802.11ax (Wi-Fi 6) technology.

FIG. 1 is an illustration of enhanced spatial reuse of radio spectrum, according to some embodiments. As illustrated in FIG. 1, a network environment may include any number of access points and stations (such as client devices) that are served by the access points in overlapping BSSs. In some embodiments, one or more access points are to provide enhanced spatial reuse of radio spectrum utilizing at least one communication quality value. For example, a first access point (AP-0) 100 is serving various client devices 105 in a first BSS (BSS-0), a second access point (AP-1) 110 is serving various client devices 115 in a second BSS (BSS-1), and a third access point (AP-2) 120 is serving various client devices 125 in a third BSS (BSS-2). Additional BSSs in the network may be present within or outside of the illustration in FIG. 1. However, the BSSs are close in proximity and certain BSSs may be transmitting on a same or near channel, thus creating the potential for interference, such as packet collisions, reduction of SNR (Signal to Noise Ratio), or other effects.

In some embodiments, at least one BSS, such as the BSS-0, is to provide for modification of the CCA threshold based at least in part on a communication quality value for the associated client devices to prioritize spatial reuse to one or more client devices within client devices 105 that are best able to utilize the operation, and to prevent other client devices from utilizing spatial reuse to avoid unnecessary packet collisions that can reduce the overall data throughput.

In some embodiments, the communication quality value that is utilized in prioritizing spatial reuse is SINR (Signal to Interference plus Noise Ratio). In some embodiments, AP-0 100 is to determine a total SINR (uplink and downlink) for SR transmission to each of the client devices 105 based on RSS measurements to neighboring APs and between APs on a same channel. The client device with the highest total SINR value then is selected, with spatial reuse being turned off for the other client devices to ensure the medium is shared between APs, and the spatial reuse doesn't generate unnecessary signal collisions.

Figure 2:
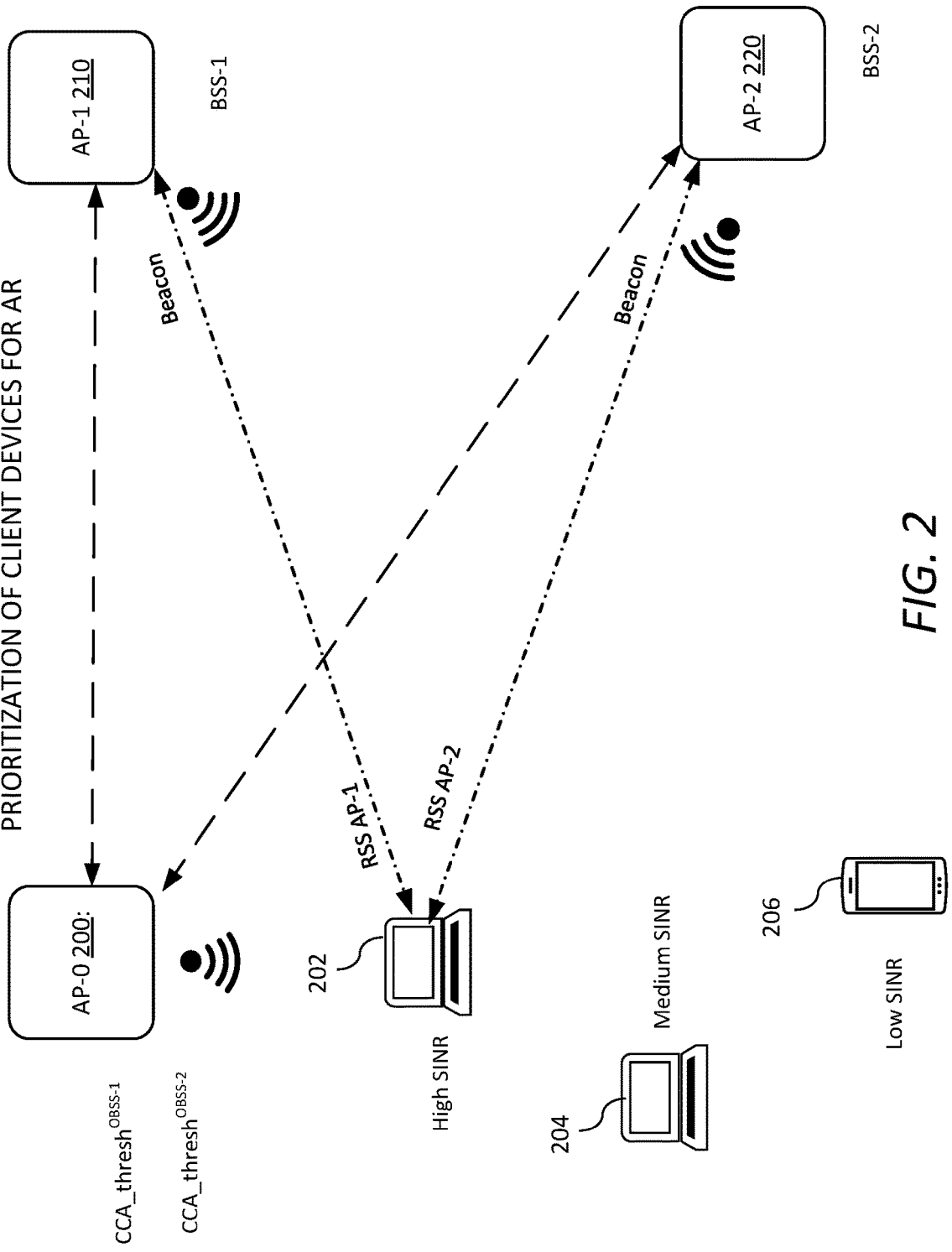
FIG. 2 is an illustration of enhanced spatial reuse of radio spectrum including prioritization of client devices for spatial reuse, according to some embodiments.

FIG. 2 is an illustration of enhanced spatial reuse of radio spectrum including prioritization of client devices for spatial reuse, according to some embodiments. As shown in FIG. 2, a particular access point AP-0 200 is to operate under the Wi-Fi 6 standard to allow for modification of a CCA threshold in a manner that allows for effective spatial reuse of radio spectrum while minimizing the potential for packet collisions in operation. In some embodiments, the access point AP-0 is to utilize SINR values for each of multiple client devices in the BSS associated with AP-0, the client devices being shown as client devices 202, 204, and 206, to identify a client device with a highest SINR among the multiple client devices, the identified client to be prioritized for SR operation. In some embodiments, other client devices with lower SINR values are not utilized in SR operation.

SINR values are generally not directly available for stations in operation of a BSS. In some embodiments, AP-0 is to estimate an SINR for each of multiple client devices utilizing measurements that are available either at the access point or from the client devices. For example, in order to estimate an SINR for signals received at the access point, the access point is to utilize RSS measures for signals (such as beacons) that received by the access point from neighboring APs. Further, in order to generate an SINR estimate for signals received at client devices, an access point is to utilize RSS for signals from other access points that are received by the client devices, and specifically via 802.11k beacon reports, wherein client devices are to measure RSS for beacons from the neighboring access points and report this data back to the associated access point. Such data thus may be received from the access points. For example, client device 202 may receive beacons from each of AP-1 210 and AP-2 220, and report back such data to the associated access point.

In some embodiments, access point AP-0 is to utilize the received RSS data to estimate the SINR at the client for downlink (DATA) transmissions from the AP to the client (which may be referred as the downlink SINR, or $SINR^{dwn}$). Further, AP-0 is utilize RSS data to estimate the SINR for uplink (ACK) transmissions from the client to the access point (which may be referred to as the uplink SINR, or $SINR^{upl}$). The access point AP-0 is then to utilize the estimated downlink SINR and the estimated uplink SINR to generate an estimated total SINR for SR transmission to a client ($SINR^{tot}$) for use in comparing client devices for SR transmissions and operations.

In some embodiments, the total SINR is generated utilizing an adjustable parameter α to appropriately weight the downlink SINR and the uplink SINR. Because the downlink DATA packet is in general much longer than the uplink ACK, it may be presumed that the downlink should be more protected and heavily weighted in calculation. In some embodiments, the total SINR for SR transmission to a client device i may be determined based on the estimated downlink SINR and uplink SINR values and a weight value a as provided in Equation [1]:

$$SINR_i^{tot} = \alpha SINR_i^{dwn} + (1-\alpha)SINR_i^{upl} \qquad [1]$$

In a particular implementation the a value may be 0.8, but this α value may vary, and may be adjusted as needed to optimize spatial reuse operation for a particular implementation.

In some embodiments, when AP-0 has data queued (i.e., backlogged data) for each of an identified set of client devices, the access point AP-0 200 is to compare the total SINR for SR transmission to each client device of the set of client devices to identify the client device having the highest total SINR, and is to prioritize this client device in spatial reuse. More specifically, the access point is to enable spatial reuse for the client device having the highest total SINR, and to disable spatial reuse for each other client device of the identified set of client devices. For example, assuming that access point AP-0 has queued data for client devices 202, 204, and 206 in FIG. 2, AP-0 may determine that client device 202 has a high total SINR, client device 204 has a medium total SINR, and client device has a low total SINR. Based on a comparison of the total SINR values for the identified client devices, access point AP-0 is to enable SR operation for client device 202, and disable SR operation for client devices 204 and 206.

In operation, the access point AP-0 is then to apply spatial reuse in communication with client device 202 when this is appropriate. More specifically, for communication with client device 202, upon receiving a signal that is determined to be from an OBSS, AP-0 is to compare the received signal strength to a dynamically adjusted threshold CA-thresh$^{OBSS}$ to determine whether or not to proceed with transmission. In some embodiments, a separate OBSS threshold CCA-thresh$^{OBSS}$ is determined and maintained for each OBSS. As illustrated in FIG. 2, a first CA threshold, indicated as CCA-thresh$^{OBSS-1}$, is determined and maintained for BSS-1 and a second CA threshold, CCA-thresh$^{OBSS-2}$, is determined and maintained for BSS-2.

Figure 3A:
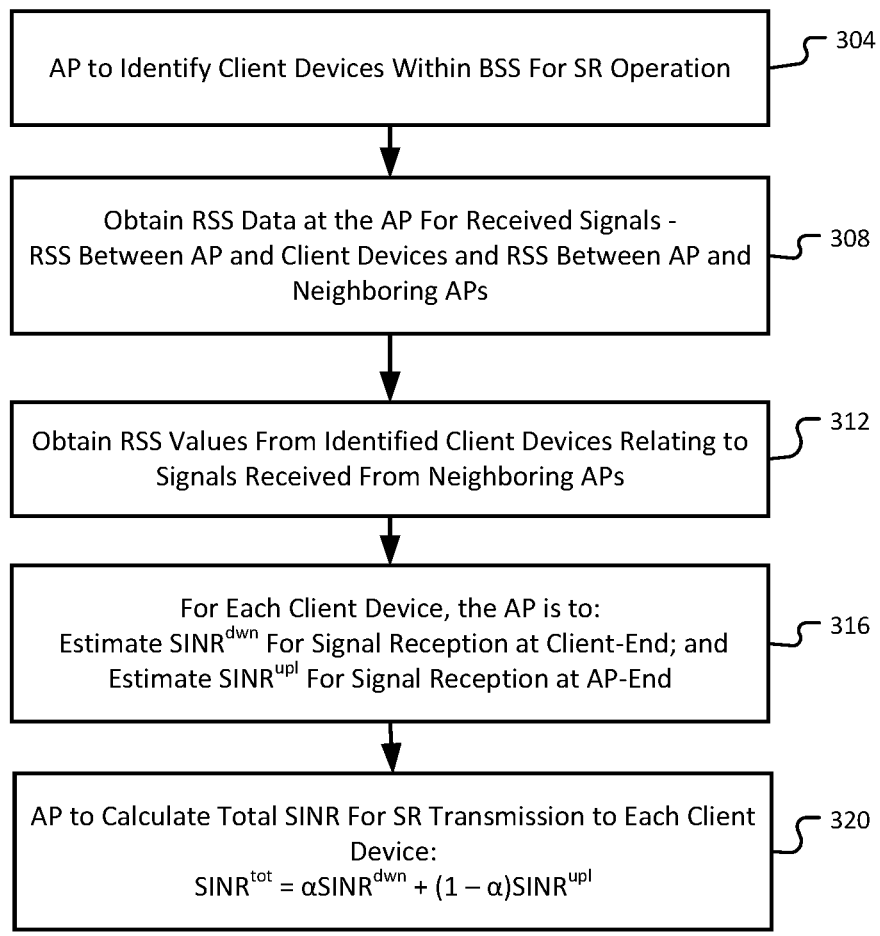
FIGS. 3A and 3B are flow charts to illustrate a process for enhanced spatial reuse of radio spectrum including prioritization of client devices based on communication quality, according to some embodiments.
Figure 3B:
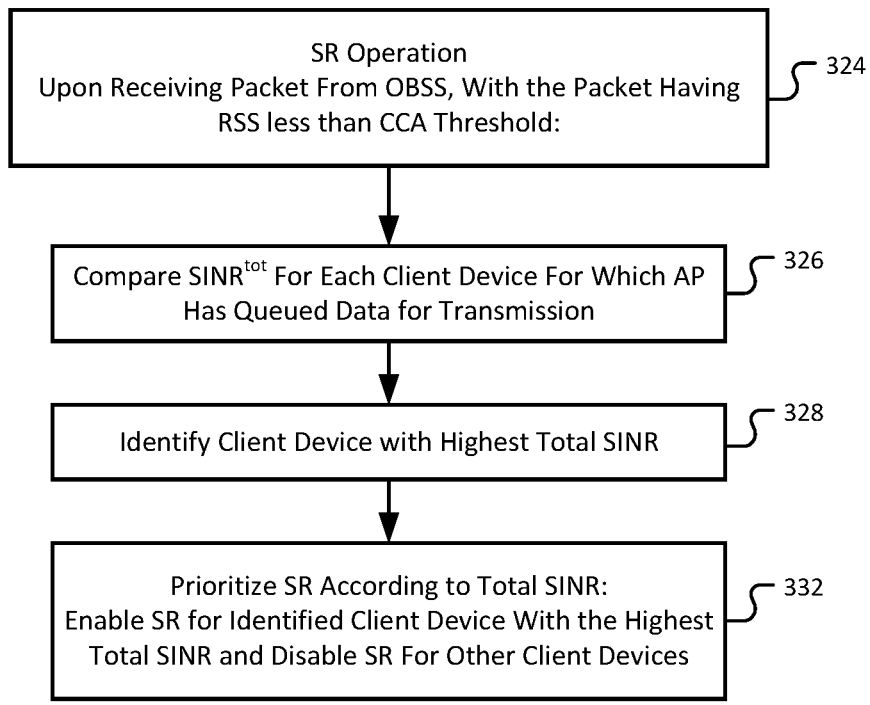
Figure 7:
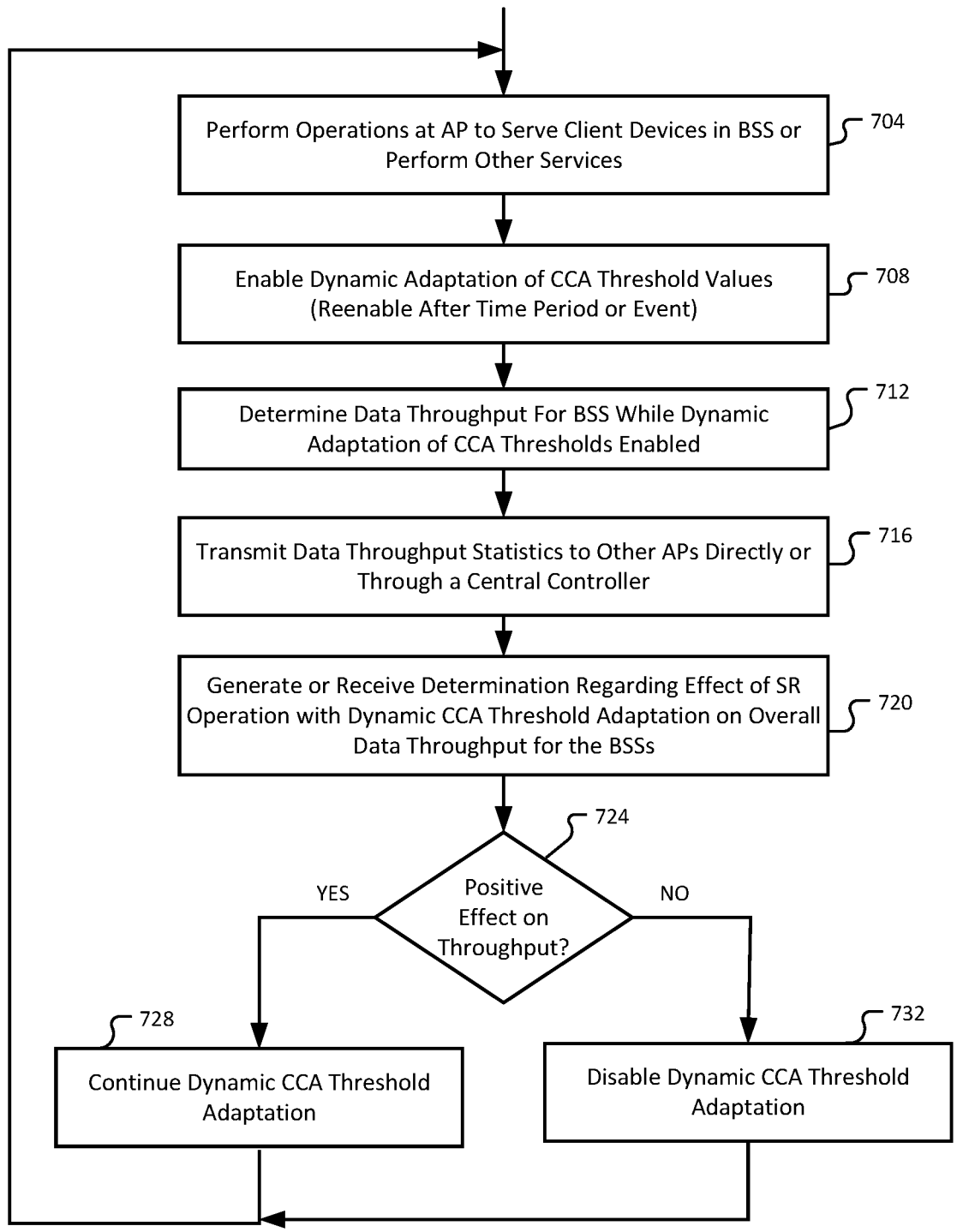
FIG. 7 is a flow chart to illustrate operations for coordination between access points for spatial reuse operation, according to some embodiments.

In some embodiments, SINR calculation and client device prioritization may be as further illustrated in FIGS. 3A and 3B. Operation of enhanced spatial reuse of radio spectrum may be as further illustrated in FIGS. 4 and 5. In some embodiments, the access point AP-0 may further coordinate with other access points within the network environment, such as AP-1 and AP-2, as illustrated in FIG. 7 to share statistics to determine the effect of dynamic adaptation of CCA threshold values on the overall data throughput in the network, and to discontinue dynamic adaptation of CCA thresholds if the SR operation has a negative effect on overall data throughput.

FIGS. 3A and 3B are flow charts to illustrate a process for enhanced spatial reuse of radio spectrum including prioritization of client devices based on communication quality, according to some embodiments. As illustrated in FIG. 3A, an access point, such as access point AP-0 200 illustrated in FIG. 2, is to identify client devices within a BSS associated with the access point for spatial reuse operation 304. The client devices that may be identified for SR operation are devices having queued packets at the AP that are awaiting transmission.

In some embodiments, the access point is to obtain RSS data at the AP for received signals 308, wherein the RSS data may include RSS between the AP and the client devices within the BSS and RSS between the AP and neighboring APs, which the AP may determine from beacons transmitted by the neighboring APs. The AP is further to obtain RSS values for each of the client devices of the BSS relating to signals received from neighboring access points 312. The RSS values for signals received at the client devices may relate to IEEE 802.11k beacon reports, wherein client devices are to measure RSS for beacons from neighboring access points and report this data back to the associated access point.

In some embodiments, for each client of the BSS the access point is to utilize the RSS data to estimate a downlink SINR for signal reception at the client-end and is to estimate an uplink SINR for signal reception at the AP-end 316. The access point is then to calculate a total SINR for SR transmission to each client device based on the downlink SINR and uplink SINR 320, such as provided in Equation [1].

The calculated SINR values may then be used in an SR operation, as illustrated in FIG. 3B. In some embodiments, upon receiving a packet from an OBSS, with the packet having an RSS that is less than a CCA threshold 324 (as further illustrated in FIG. 4), the access point is to compare the total SINR for each client device for which the access point has queued data for transmission 326, and identify which of the client devices has the highest SINR 328.

The access point is then to prioritize spatial reuse based on the total SINR for each client device 332, which may include enabling spatial reuse for the identified client device having the highest total SINR and disabling spatial reuse for each other client device. In this way, the spatial reuse operation is prioritized for client devices that are best able to take advantage of spatial reuse. The enhanced spatial reuse operation may then be performed as provided in FIGS. 4 and 5.

Figure 4:
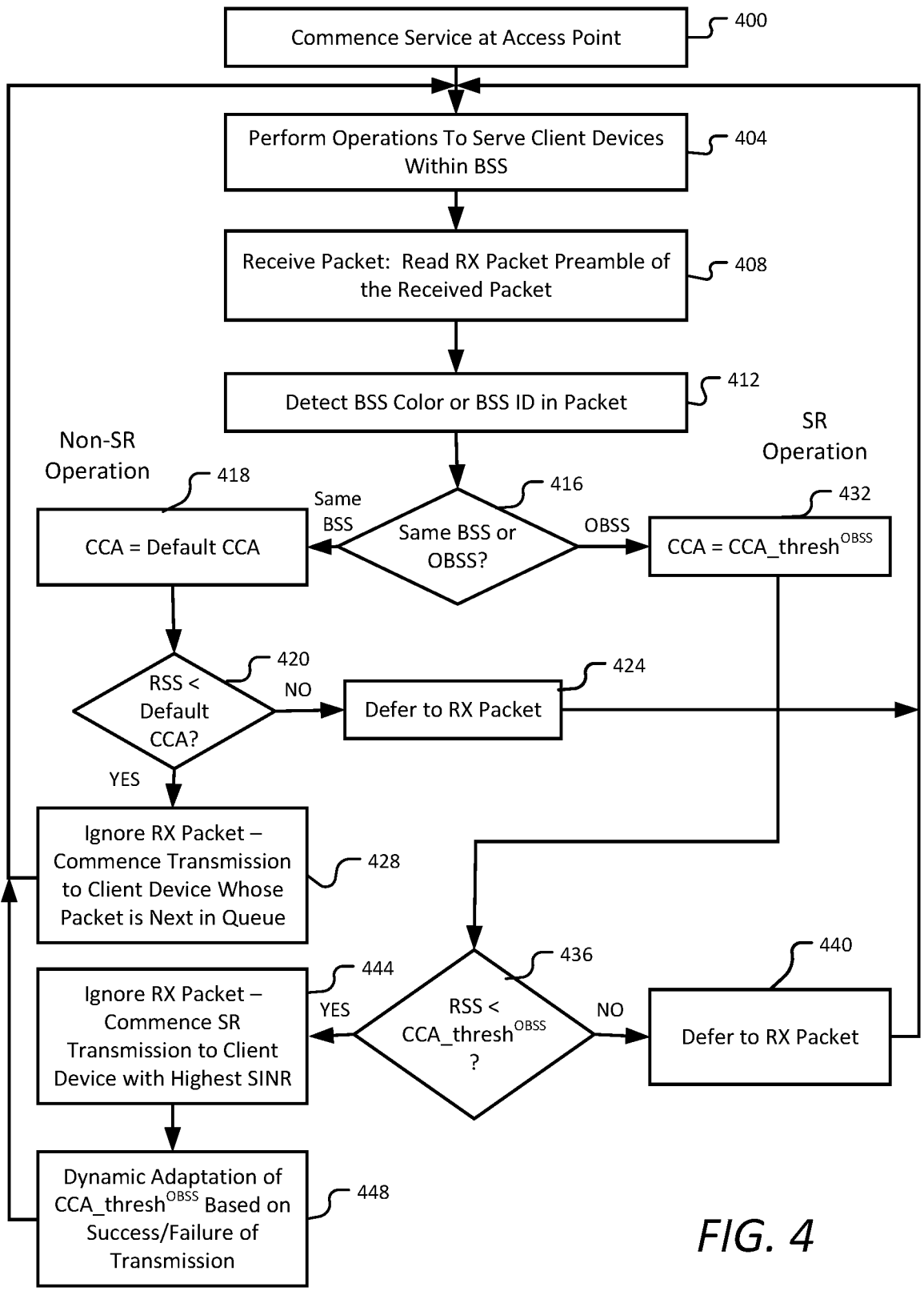
FIG. 4 is a flow chart to illustrate a process for operation of enhanced spatial reuse of radio spectrum, according to some embodiments.

FIG. 4 is a flow chart to illustrate a process for operation of enhanced spatial reuse of radio spectrum, according to some embodiments. As illustrated in FIG. 4, service is commenced at an access point in a particular BSS 400, such as access point AP-0 200 illustrated in FIG. 2, the service provided including exchange of data with client devices in the BSS. However, the BSS may be in close proximity with one or more other BSSs, and thus there is risk of interference, packet collisions, or both caused by other signal transmissions, with the access point to defer to other transmissions upon determining that a detected signal energy is above a CCA threshold.

The access point is to perform operations to serve the client devices within the BSS 404. In these operations, upon the access point receiving a packet for processing, the access point is to read the preamble of the RX packet 408 to determine a source of the packet. In some instances the packet preamble will contain a BSS color that may be utilized to distinguish the BSS. However, in other instances a BSS color may not be present, but a BSS identification (ID) may be determined from other data in fields within the preamble. In some embodiments, a BSS color or BSS ID indicated in the packet is detected 412, and, based on the detected BSS color or BSS ID, the access point is to determine whether the source of the packet is within the same BSS as the access point (because the BSS color or BSS ID matches the BSS of the access point) or is within an overlapping BSS (because the BSS color or BSS ID does not match the BSS of the access point, indicating an OBSS source) 416.

Upon determining that the BSS color or BSS ID indicates the same BSS 416 (thus indicating that non-SR operation), the access point is to establish a CCA threshold equal to a default CCA threshold value 418, which is −82 dBm. The process may then proceed with determining whether the RSS of the received packet is less than the default CCA threshold 420. If not, then the access point is to defer to the received packet 424, and thus avoid any signal conflict. If the RSS of the received packet is less than the default CCA threshold 420, then access point may ignore the received packet and commence transmission to a client device whose packet is next in the AP's queue 428.

However, determining that the BSS color or BSS ID indicates an OBSS source rather than the same BSS 416 (thus indicating an SR operation), the access point is to establish a CCA equal to a CCA threshold value for an OBSS 432, indicated as CCA_thresh$^{OBSS}$. In some embodiments, the value for CCA_thresh$^{OBSS}$ may be an adaptable value between −62 dBm and −82 dBm. In some embodiments, a separate CCA threshold may be established for each OBSS that is detected by access point, with the identity of the OBSS being determined based on the detected BSS color or BSS ID.

The process may then proceed with determining whether the RSS of the received packet is less than the CCA threshold for the OBSS 436. If not, then the access point is to defer to the received packet 440. If the RSS of the received packet is less than the adaptable CCA threshold for the OBSS 436, then the access point may ignore the receive packet and commence transmission to the client device having the highest SINR value (as illustrated in FIGS. 3A and 3B) 444, allowing transmission with a higher received signal energy than would be allowed for normal transmissions within the BSS.

In some embodiments, the process then provides for dynamic adaptation of the CCS threshold for the OBSS based at least in part on the success or failure of the SR transmission 448. The determination and dynamic adaptation of the CCA threshold for the OBSS may be as illustrated in FIG. 5.

Figure 5:
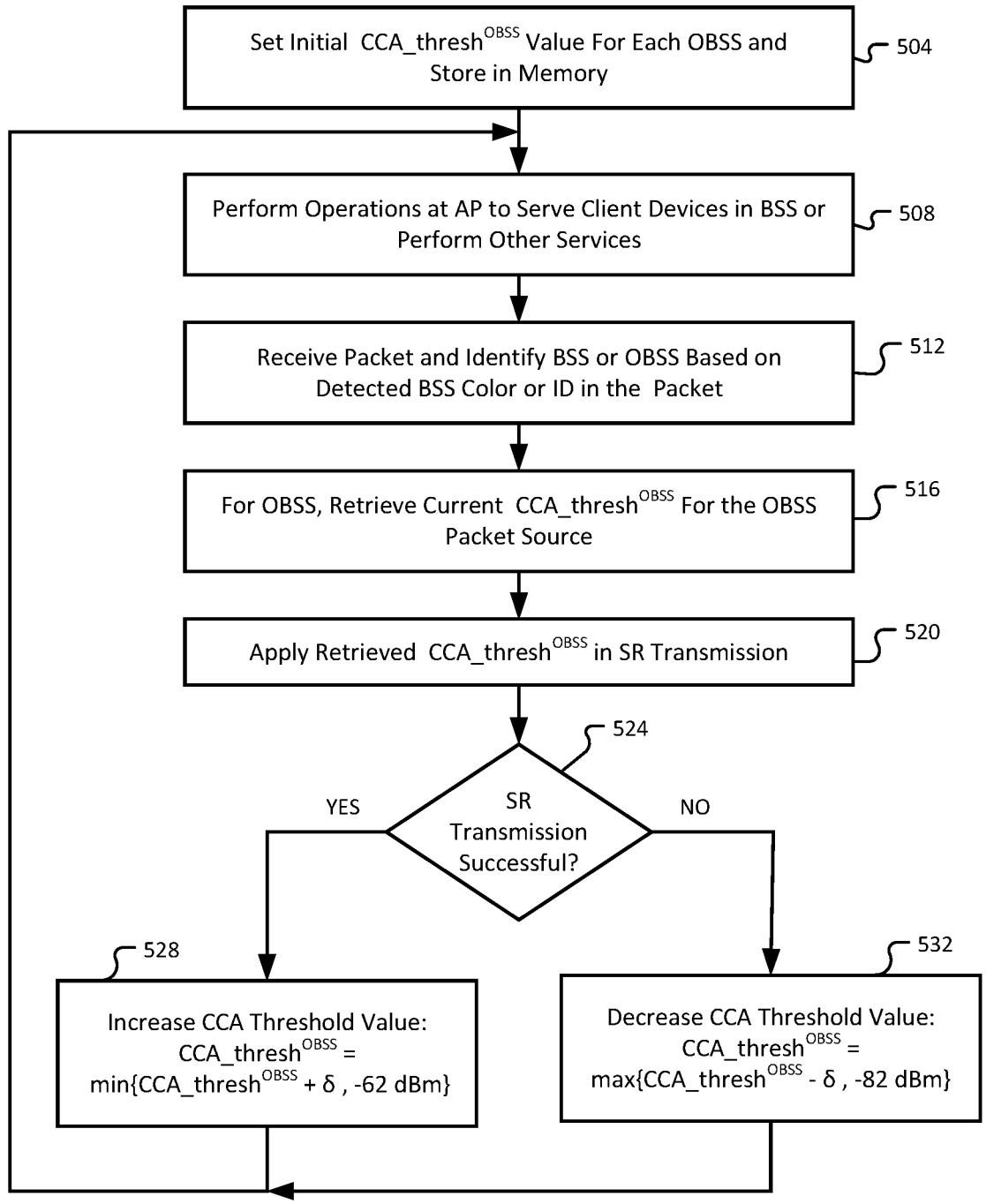
FIG. 5 is a flow chart to illustrate a process for enhanced spatial reuse of radio spectrum including dynamic adaptation of CCA thresholds, according to some embodiments.

FIG. 5 is a flow chart to illustrate a process for enhanced spatial reuse of radio spectrum including dynamic adaptation of CCA thresholds, according to some embodiments. In some embodiments, an algorithm is provided to set and adjust a CCA threshold for each of multiple OBSSs based at least in part on the success or failure of SR transmissions.

As illustrated in FIG. 5, in some embodiments a process may include setting an initial CCA threshold ($CCA\_thresh^{OBSS}$) for each of one or more OBSSs in an environment 504. In some cases the initial OBSS may be certain starting value for every OBSS, or may be set according to a different process. In one example, an initial OBSS threshold may be set at −72 dBm as a middle value between −62 dBm and −82 dBm, or may be set at −82 dBm as a conservative initial value. However, an initial value may be any value between −62 dBm and −82 dBm.

The process may proceed with performing operations at the access point to serve client devices in the BSS or to perform other services 508. In operation the access point is to receive a packet, and to identify a packet source as either the BSS associated with the access point or a particular OBSS based on a detected BSS color or BSS ID within the packet 512.

In some embodiments, for a packet source that is determined to be a particular OBSS, the access point is to retrieve a current CCA threshold value for the OBSS packet source 516. The access points is then to apply the retrieved current CCA threshold in the SR transmission 520.

In some embodiments, the access point is to dynamically adjust the CCA threshold value based on success or failure of an SR transmission in order to tune the CCA threshold value associated with an OBSS to an optimal value between the −62 dBm maximum value and the −82 dBm minimum value. For example, as illustrated in FIG. 5, if an SR transmission is determined to be successful 524 (the transmission is successfully received by the intended recipient), then, as provided in Equation [2], the CCA threshold value for the OBSS is set to be the minimum of either the current CCA threshold value increased by an amount δ or −62 dBm (the maximum CCA threshold value) 528:

$$CCA\_thresh^{OBSS} = \min(CCA\_thresh^{OBSS} + \delta, -62 \text{ dBm}) \quad [2]$$

Further, if an SR transmission is determined to be unsuccessful 524 (the transmission is not successfully received by the intended recipient), then, as illustrated in Equation [3], the CCA threshold value for the OBSS is set to be the maximum of the current CCA threshold value decreased by an amount δ or −82 dBm (the minimum CCA threshold value) 532:

$$CCA\_thresh^{OBSS} = \min(CCA\_thresh^{OBSS} + \delta, -62 \text{ dBm}) \quad [3]$$

The increment δ value may be any amount that allows for tuning the CCA value within a reasonable time without causing significant oscillation in value. In a particular example, δ may equal 1 or 2 dBm. In some embodiments, the δ value is adjustable to improve operation of the algorithm. Further, there may be different δ value for increasing or decreasing the CCA threshold value for an OBSS.

The process then can return to performing operations at the access point 508, with each OBSS threshold value being tuned upward or downward depending the success or failure of each transmission.

Figure 6:
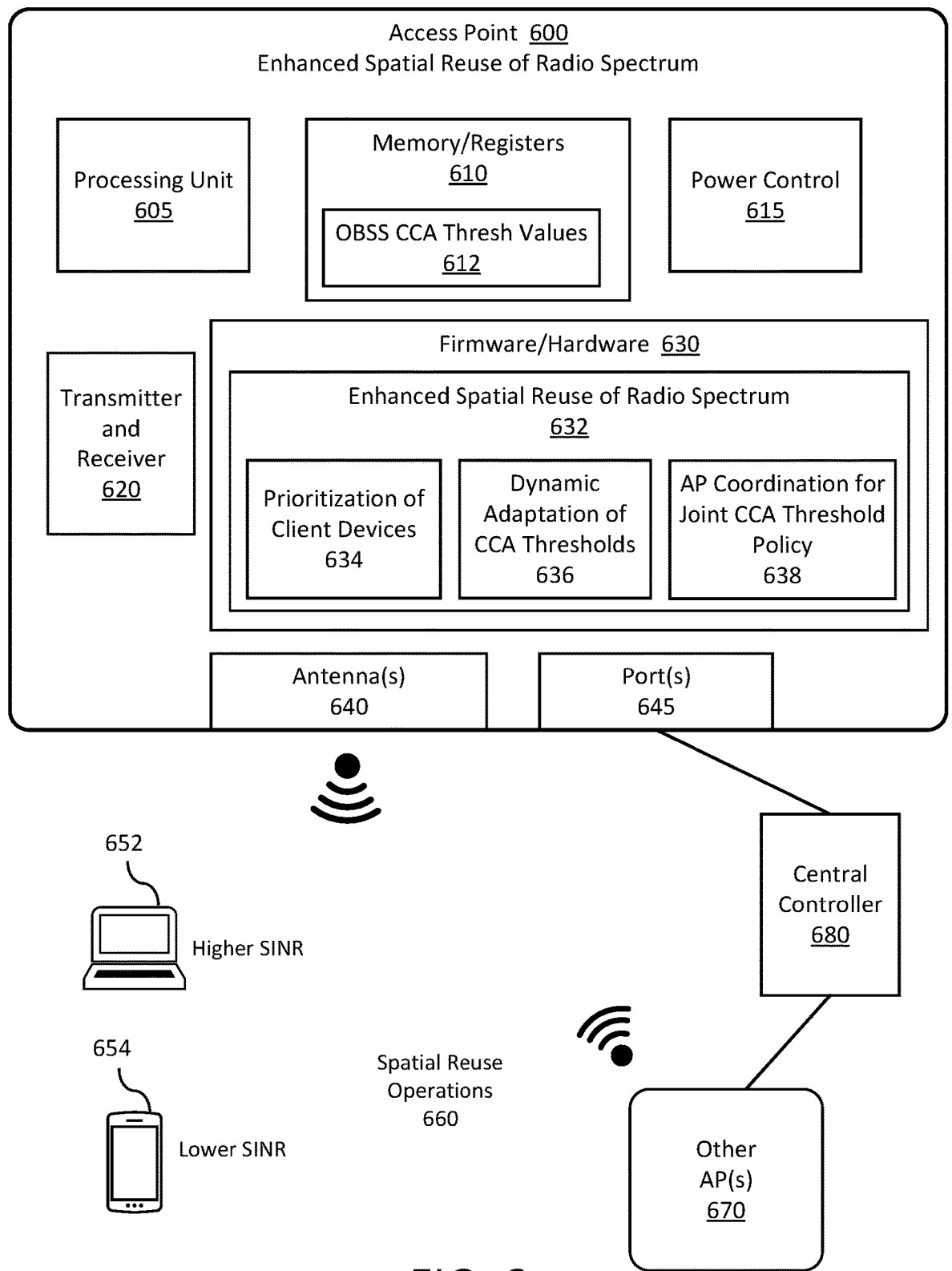
FIG. 6 is an illustration of an access point including enhanced spatial reuse of radio spectrum, according to some embodiments.

FIG. 6 is an illustration of an access point including enhanced spatial reuse of radio spectrum, according to some embodiments. In some embodiments, the access point 600 includes a processing unit 605, a transmitter and receiver 620, power control 615, one or more antennas 640 for wireless signal communication, and one or more ports 645 for network connections or other connections. The access point 600 may further include memory and registers 610 for storage of data, which may include volatile and nonvolatile memory (including flash memory and similar elements), registers, and other storage technologies. In some embodiments, the memory and registers 610 may include one or more OBSS threshold values 612, which may be set and adapted as illustrated in FIG. 5.

In some embodiments, the access point 600 further includes firmware or hardware 630 to provide enhanced spatial reuse of radio spectrum 632. In some embodiments, the enhanced spatial reuse of radio spectrum 632 includes support for prioritization of client devices for SR operation 634. An operation may include prioritization according to communication quality of each client device, such as illustrated in FIGS. 3A and 3B. For example, the access point may be operable to use RSS at the access point 600 and each of multiple client devices 652-654 to estimate a total communication quality, such as an estimated total SINR value, for SR transmission to each client device. For example, the access point 600 may determine that client device 652 has a higher estimated SINR value than each other client device 654, and thus will prioritize SR usage for the client device 652. For example, the access point 600 may enable SR operation for the client device 652 having the highest estimated SINR value and disable SR operation for each other client device 654.

In some embodiments, the enhanced spatial reuse of radio spectrum 632 further includes dynamic adaptation of CCA thresholds 636, such as illustrated in FIGS. 4 and 5. In some embodiments, the access point 600 is to provide SR operation 660 in a network environment with one or more other access points 670. The SR operation includes providing an adaptable CCA threshold value for each OBSS associated with the one or more other access points 670. In some embodiments, each detected OBSS is provided a separate CCA threshold value that is increased or decreased (between a maximum and minimum value) based at least in part on whether SR transmissions are successful or unsuccessful.

In some embodiments, the enhanced spatial reuse of radio spectrum 632 further includes coordination between access points for a joint CCA adaptation policy 638, such as illustrated in FIG. 7. In some embodiments, the access point 600 is to provide data to other access points, either directly or through a central controller 680, regarding SR operation with dynamic CCA threshold adaptation. The data may include statistics regarding data throughput for the BSS associated with the access point 600. In some embodiments, the access point is to generate or receive a determination regarding the effect of SR operation with dynamic adaptation of CCA thresholds on an overall data throughput, and to continue or discontinue the dynamic adaptation of CCA thresholds based at least in part on the determination.

FIG. 7 is a flow chart to illustrate operations for coordination between access points for spatial reuse operation including a joint CCA threshold adaptation policy, according to some embodiments. Dynamic adaptation of CCA values by an access point may improve the data throughput for a BSS associated with the access point. However, the operation may at the same time reduce data throughput at another BSS because of the increased power of transmission generating packet collisions.

In some embodiments, an access point, such as access point AP-0 200 illustrated in FIG. 2, is to provide coordination with one or more other access points in an environment with regard to spatial reuse of radio spectrum. The coordination includes, but is not limited to, sharing of data regarding data throughput to allow a determination regarding whether the dynamic adaptation of CCA thresholds is providing an overall positive or negative impact on use of the radio spectrum. In some embodiments, the coordination between access points may further include the access point to disable dynamic CCA threshold adaptation upon a determination that this is providing a negative impact.

As illustrated in FIG. 7, an access point may perform normal operations to serve client devices in a BSS or perform other related services 704. In some embodiments, the access point may enable dynamic adaptation of CCA threshold values if required 708, which may include reenabling the dynamic adaptation of CCA thresholds if the operation has been previously disabled. The dynamic adaptation of CCA thresholds may include processes illustrated in FIGS. 4 and 5.

In some embodiments, the process proceeds with determination of data throughput for the BSS associated with the access point while dynamic adaptation of CCA thresholds is enabled 712. The access point is then to transmit data including data throughput statistics to other access points of a set of BBSs in an environment (such as in an extended service set (ESS)), either directly or through a central controller 716.

In some embodiments, the access point is then to either generate or receive a determination (i.e., the determination may be made by the access point or may be made by another network apparatus, such as a central controller) regarding an effect of spatial reuse operation with dynamic adaptation of CCA thresholds on overall data throughput for the BSSs in the network environment 720. In some embodiments, upon determining that the dynamic adaptation of CCA thresholds has had a positive effect on overall data throughput 724, the access point is to continue dynamic adaptation of CCA thresholds 728. Upon determining that the dynamic adaptation of CCA thresholds has had a negative effect on overall data throughput 724, the access point is to disable dynamic adaptation of CCA thresholds 732. Upon disabling the dynamic adaptation of CCA thresholds, the access point is to utilize the default CCA threshold value (−82 dBm) in SR operations.

The process may then return to performance of operations of the AP 704. and, if the dynamic adaptation of CCA thresholds has been disabled, the operation may be re-enabled after passage of a certain amount of time or upon the occurrence of a certain event 708, wherein the event may include receipt of a trigger to reenable such operation.

The following clauses and/or examples pertain to further embodiments or examples. Specifics in the examples may be applied anywhere in one or more embodiments. The various features of the different embodiments or examples may be variously combined with certain features included and others excluded to suit a variety of different applications. Examples may include subject matter such as a method, means for performing acts of the method, at least one machine-readable medium, such as a non-transitory machine-readable medium, including instructions that, when performed by a machine, cause the machine to perform acts of the method, or of an apparatus or system for facilitating operations according to embodiments and examples described herein.

In some embodiments, one or more non-transitory computer-readable storage mediums have stored thereon executable computer program instructions that, when executed by one or more processors, cause the one or more processors to perform operations including connecting with a plurality of client devices at an access point in a basic service set (BSS) for transmission over a channel in a network environment; estimating a communication quality value for each of the plurality of client devices based at least in part on received signal strength values at the access point and at the client device; prioritizing spatial reuse operation based on the estimated communication quality values for the plurality of client devices; establishing a clear channel assessment (CCA) threshold for a spatial reuse operation in a transmission to a first client device of the plurality of client devices, the first client device being selected based on an estimated communication quality value for the first client device; and dynamically adjusting the CCA threshold based at least in part on success or failure of data transmission between the access point and the first client device.

In some embodiments, an access point includes a processor; a memory for storage of data; a transmitter and receiver to transmit and receive data; wherein the access point is to provide enhanced spatial reuse of radio spectrum in a network environment, including the access point to connect with a plurality of client devices for transmission over a channel in the network environment, estimate a signal to interference plus noise ratio (SINR) value for transmission to each of the plurality of client devices based at least in part on received signal strength values at the access point and at the client device, prioritize spatial reuse operation based on the estimated SINR values for the plurality of client devices, establish a clear channel assessment (CCA) threshold for the spatial reuse operation, and dynamically adjust the CCA threshold for the spatial reuse operation of a first client device of the plurality of client devices based at least in part on success or failure of data transmission between the access point and the first client device.

In some embodiments, a method includes providing service by an access point to a plurality of client devices in a basic service set within a network environment; receiving a packet at the access point; determining a source of the packet based on a BSS color or BSS identification obtained from the packet; upon determining that the source of the packet is within the BSS, utilizing a default clear channel assessment (CCA) value in in an operation for transmission to a client device of the plurality of client devices; and upon determining that the source of the packet is with a first overlapping BSS (OBSS), utilizing a current value of CCA threshold value for the first OBSS in a spatial reuse operation for transmission to a first client device, the first client device having a highest estimated signal to interference plus noise ratio (SINR) value of the plurality of client devices, wherein the CCA threshold value for the first OBSS is a dynamically adjusted value based at least in part on success or failure of data transmission between the access point and the first client device.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer. In some embodiments, a non-transitory computer-readable storage medium has stored thereon data representing sequences of instructions that, when executed by a processor, cause the processor to perform certain operations.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

What is claimed is:

1. One or more non-transitory computer-readable storage mediums having stored thereon executable computer program instructions that, when executed by one or more processors, cause the one or more processors to perform operations comprising:
   connecting with a plurality of client devices at an access point in a basic service set (BSS) for transmission over a channel in a network environment;
   estimating a communication quality value for each of the plurality of client devices based at least in part on received signal strength values at the access point and at the client device;
   prioritizing spatial reuse operation based on the estimated communication quality values for the plurality of client devices;
   establishing a clear channel assessment (CCA) threshold for a spatial reuse operation in a transmission to a first client device of the plurality of client devices, the first client device being selected based on an estimated communication quality value for the first client device; and
   dynamically adjusting the CCA threshold based at least in part on success or failure of data transmission between the access point and the first client device.

2. The one or more storage mediums of claim 1, wherein estimating the communication quality value for each of the plurality of client devices includes estimating a total signal to interference plus noise ratio (SINR) value based on an estimated uplink SINR value and an estimated downlink SINR value.

3. The one or more storage mediums of claim 1, wherein prioritizing spatial reuse operation based on the estimated communication quality values for the plurality of client devices includes enabling spatial reuse for a client device having a highest estimated communication quality value and disabling spatial reuse for any other client devices of the plurality of client devices.

4. The one or more storage mediums of claim 1, further comprising instructions to cause the one or more processors to perform operations comprising:

establishing and dynamically adjusting a CCA threshold value for each of a plurality of overlapping BSSs (OBSSs).

5. The one or more storage mediums of claim 4, further comprising instructions to cause the one or more processors to perform operations comprising:
receiving a packet at the access point;
determining a source of the packet based on a BSS color or BSS identification obtained from the packet;
upon determining that the source of the packet is within the BSS, utilizing a default CCA value in an operation for transmission to a client device of the plurality of client devices; and
upon determining that the source of the packet is with a first OBSS of the plurality of OBSSs, utilizing a current value of the CCA threshold value for the first OBSS in the spatial reuse operation for transmission to the first client device.

6. The one or more storage mediums of claim 1, further comprising instructions to cause the one or more processors to perform operations comprising:
determining data throughput information for the access point utilizing spatial reuse with dynamic adaptation of CCA threshold values; and
providing the data throughput information to one or more other access points in the network environment for coordination of operation with the one or more other access points.

7. The one or more mediums of claim 6, further comprising executable computer program instructions that, when executed by the one or more processors, cause the one or more processors to perform operations comprising:
upon a determination indicating that there is a negative impact on overall data throughput for the network environment when utilizing dynamic adaptation of CCA values, disabling the dynamic adaptation of CCA values.

8. The one or more storage mediums of claim 1, wherein dynamically adjusting the CCA threshold is performed according to IEEE (Institute of Electronic and Electrical Engineers) 802.11ax.

9. An access point comprising:
a processor;
a memory for storage of data;
a transmitter and receiver to transmit and receive data;
wherein the access point is to provide enhanced spatial reuse of radio spectrum in a network environment, including the access point to:
connect with a plurality of client devices for transmission over a channel in the network environment,
estimate a signal to interference plus noise ratio (SINR) value for transmission to each of the plurality of client devices based at least in part on received signal strength values at the access point and at the client device,
prioritize spatial reuse operation based on the estimated SINR values for the plurality of client devices,
establish a clear channel assessment (CCA) threshold for the spatial reuse operation, and
dynamically adjust the CCA threshold for the spatial reuse operation of a first client device of the plurality of client devices based at least in part on success or failure of data transmission between the access point and the first client device.

10. The access point of claim 9, wherein estimating the SINR value for transmission to each of the plurality of client devices includes estimating a total SINR (SINR) value based on an estimated uplink SINR value, an estimated downlink SINR value, and a weighting value.

11. The access point of claim 9, wherein prioritizing spatial reuse operation based on the SINR values for the plurality of client devices includes enabling spatial reuse for a client device having a highest estimated SINR value and disabling spatial reuse for any other client devices of the plurality of client devices.

12. The access point of claim 9, wherein the access point is further to:
establish and dynamically adjust a CCA threshold value for each of a plurality of overlapping BSSs (OBSSs).

13. The access point of claim 12, wherein the access point is further to:
receive a packet at the access point;
determine a source of the packet based on a BSS color or BSS identification obtained from the packet;
upon determining that the source of the packet is within the BSS, utilize a default CCA value in the spatial reuse operation; and
upon determining that the source of the packet is with a first OBSS of the plurality of OBSSs, utilize a current value of the CCA threshold value for the first OBSS in the spatial reuse operation.

14. The access point of claim 9, wherein the access point is further to:
determine data throughput information for the access point utilizing spatial reuse with dynamic adaptation of CCA threshold values; and
provide the data throughput information to one or more other access points in the network environment for coordination of operation with the one or more other access points.

15. The access point of claim 14, wherein the access point is further to:
generate or receive a determination regarding an effect on an overall data throughput for the network environment when utilizing dynamic adaptation of CCA values; and
upon the determination indicating a negative impact on overall data throughput for the network environment when utilizing dynamic adaptation of CCA values, disabling the dynamic adaptation of CCA values.

16. A method comprising:
providing service by an access point to a plurality of client devices in a basic service set within a network environment;
receiving a packet at the access point;
determining a source of the packet based on a BSS color or BSS identification obtained from the packet;
upon determining that the source of the packet is within the BSS, utilizing a default clear channel assessment (CCA) value in in an operation for transmission to a client device of the plurality of client devices; and
upon determining that the source of the packet is with a first overlapping BSS (OBSS), utilizing a current value of CCA threshold value for the first OBSS in a spatial reuse operation for transmission to a first client device, the first client device having a highest estimated signal to interference plus noise ratio (SINR) value of the plurality of client devices;
wherein the CCA threshold value for the first OBSS is a dynamically adjusted value based at least in part on success or failure of data transmission between the access point and the first client device.

17. The method of claim 16, further comprising:
further comprising disabling spatial reuse operation for any other client device of the plurality of client devices.

18. The method of claim 16, further comprising:
estimating the SINR value for the first client device based on received signal strength values at the access point and at the first client device.

19. The method of claim 16, further comprising:
determining data throughput information for the access point utilizing spatial reuse with dynamic adaptation of CCA threshold values; and
providing the data throughput information to one or more other access points in the network environment for coordination of operation with the one or more other access points.

20. The method of claim 16, wherein the CCA threshold value for the first OBSS is between a minimum of −82 dBm and a maximum of −62 dBm.

\* \* \* \* \*